United States Patent [19]
Delmas et al.

[11] Patent Number: 5,067,416
[45] Date of Patent: Nov. 26, 1991

[54] PROCESS FOR PRODUCING AN ACID-RESISTANT BARRIER SEAL IN SOIL, AND CONCRETE USABLE FOR THIS PURPOSE

[75] Inventors: Francis M. L. Delmas, Paris; Michel A. G. Gandais, Perthes, both of France

[73] Assignee: Sondages Injections Furages "S.I.F." Enterprise Bachy, Levallois-Perret, France

[21] Appl. No.: 599,119

[22] Filed: Oct. 17, 1990

Related U.S. Application Data

[62] Division of Ser. No. 357,954, May 30, 1989, Pat. No. 4,983,075.

[30] Foreign Application Priority Data

May 31, 1988 [FR] France ................... 88 07206

[51] Int. Cl.$^5$ ............................. C04B 12/04
[52] U.S. Cl. ............................. 106/632; 405/263
[58] Field of Search ............. 405/267, 263, 128, 129; 166/293; 106/74, 76, 611, 632, 900, 633

[56] References Cited

U.S. PATENT DOCUMENTS

| | | | |
|---|---|---|---|
| 2,240,393 | 4/1941 | Dietz | 106/632 |
| 3,094,846 | 6/1963 | Peeler | 106/900 |
| 3,146,828 | 9/1964 | Mann | 106/633 X |
| 3,335,018 | 8/1967 | Peeler | 106/900 |
| 3,835,926 | 9/1974 | Clement | 166/292 X |
| 3,837,872 | 9/1974 | Conner | 106/611 |
| 4,056,937 | 11/1977 | Suzuki | 405/263 |

FOREIGN PATENT DOCUMENTS 1336090 7/1963 France ................... 405/267

Primary Examiner—Dennis L. Taylor
Attorney, Agent, or Firm—Watson, Cole, Grindle & Watson

[57] ABSTRACT

A process for producing a barrier seal in soil which must be in contact with an acidic water which has a pH below 5.5, wherein a trench is excavated in the soil and the trench produced is filled with a sealing concrete including water, a clay and an acid-resistant granulate with self-filtering properties, the sealing concrete additionally including an aqueous solution of sodium and/or potassium silicate and is devoid of any acidic or acid-generating matter liable to form a silicic acid gel with the silicate. The proportion of sodium and/or potassium silicate incorporated in the sealing concrete is sufficient to give rise to the formation of a leakproof local barrier when the sealing wall is locally subjected to the percolation of acid water originating from the surrounding soil.

5 Claims, No Drawings

PROCESS FOR PRODUCING AN ACID-RESISTANT BARRIER SEAL IN SOIL, AND CONCRETE USABLE FOR THIS PURPOSE

CROSS REFERENCE TO RELATED APPLICATION

This application is a divisional application of application Ser. No. 357,954, filed on May 30, 1989 now U.S. Pat. No. 4,983,075.

BACKGROUND OF THE INVENTION

The technique of providing barrier seals in soil in the form of cast walls is very frequently employed in hydraulic structures, e.g., for stopping the flow of subterranean waters with a possibility of creating an upstream reservoir or forming a dried region out of water downstream, sealing of flow channel dikes, separation of water of different salinities, and the like.

Sealing barriers or walls cast in the soil are produced by making a trench with the aid of a tool which excavates the ground and by replacing the excavated ground with a material intended to ensure the sealing. When the ground exhibits a low cohesion and when it is a question of producing a sealing wall of moderate depth, they can also be produced by making a series of impressions with the aid of a tool which is forced into the soil and by filling these impressions with a material of the grout or mortar type ensuring the sealing of the barrier thus created at the time when the tool is withdrawn.

Barrier seals are also employed in the field of environment protection so that polluted waters contaminated by harmful effluents are prevented from contaminating conserved regions. Harmful effluents are chiefly produced by industrial activities which accidentally or otherwise discharge chemical effluents into phreatic tables or into surface waters. When a barrier seal intended to conserve regions not affected by the contamination produced by polluted effluents is constructed, a problem arises concerning the longevity of the constituent material of the barrier facing the variety of chemical products liable to be present in the effluents.

In conventional works forming part of hydraulic structures, the leakproof materials making up the walls are very generally made up of grouts, mortars or sealing concretes. The grouts are prepared based on clay, more particularly bentonite, a hydraulic binder which is generally a cement and, optionally, a filler which may be inert or optionally reactive. Mortars and concretes comprise the same types of materials as grouts but, in addition, they contain a large quantity of granulates which will make up a granular skeleton. In mortars, the granulates are limited to sandy materials whereas in concretes the granulates include gravels in addition to the sandy materials.

When these materials are intended for forming screens intended to retain waters of an acidic nature, the presence of hydraulic cement (be it of Portland-type cements or of slag-based cements, which are the types most commonly employed) constitutes a point of uncertainty with regard to the longevity of the wall sealing.

If the acidity of the water liable to percolate through the sealing wall is characterized by its pH value, it is accepted that in the case of pH values from 7 to approximately 5.5 the waters are considered as slightly corrosive towards cements, whereas in the case of lower values the waters progress from a strongly corrosive to a very strongly corrosive nature as their pH falls.

Such waters are sometimes encountered in the subsoil, and the construction of walls whose sealing endures in a medium with a pH below 5.5 does not permit the incorporation of a conventional hydraulic cement, which would be destroyed in time by the acidity of the percolating waters, thus damaging the intended mechanical characteristics and sealing characteristics.

A method for reducing the risk of damage of the cement binder by the acidic waters consists in eliminating the problem by doing away with the use of cement. In this case, the grouts which are usually made up of water, clay and/or bentonite and cement can no longer be envisaged because, without cement, these grouts are merely a slurry without cohesion and without stability. The materials for filling barrier seals are then made up of mortars or of sealing concrete which themselves comprise a granular skeleton ensuring the longevity of the volume of material. The sealing is provided by the clay, and more particularly by bentonite, which fills the interstices included between the particles of the granular skeleton.

The granular skeleton exhibits particle size distribution characteristics such as to make it self-filtering and that, in particular, the clayey material runs no risk of being entrained by the percolation stream. This characteristic is obtained by the presence, arising naturally or by addition, of an appropriate quantity of fine materials with a particle size of between 0.002 mm and 0.1 mm.

This method is of a certain interest for preventing short-term destruction of the sealing against the percolation of corrosive acidic waters, but is unsatisfactory in the long term, because permeability to corrosive acidic waters increases with time. In any event, it is unsuitable when the acidic waters are highly corrosive.

This is demonstrated by an accelerated laboratory test:

a sealing concrete of the following composition by weight:

| | |
|---|---|
| siliceous gravel (5–8 mm) = | 311 kg |
| siliceous sand (<5 mm) = | 1,240 kg |
| siliceous fines (0.002–0.1 mm) = | 449 kg |
| bentonite = | 40 kg |
| water = | 386 kg | is placed in a permeability test cell and is subjected to a percolation gradient (ratio of the water pressure, expressed in cm of water, to the thickness, expressed in cm, of the sealing concrete layer tested) of 330 with a water whose pH is adjusted to the value 0 by adding sulfuric acid. The initial value of the permeability coefficient, which is $2 \times 10^{-9}$ m/s remains stable for 6 minutes, and then rapidly increases to reach the value of $10^{-8}$ m/s at the end of 15 minutes of percolation test, and continues to increase thereafter.

There is therefore an existing need for a process which makes it possible to produce sealing walls which durably withstand strongly corrosive, to very strongly corrosive, acidic waters.

The invention aims to meet this need, to which no satisfactory solution exists at this time.

SUMMARY OF THE INVENTION

More particularly, the invention relates to a process for producing a barrier seal in the soil which must be in contact with an acidic water which has a pH below 5.5, according to which a trench is excavated in the soil and the trench produced is filled with a sealing concrete comprising water, a clay and a granulate, resistant to acids, with self-filtering properties, wherein the sealing concrete additionally contains an aqueous solution of sodium and/or potassium silicate and is devoid of any acidic or acid-generating matter liable to form a solid silicic acid gel with the silicate, the proportion of sodium and/or potassium silicate, calculated in the form of $SiO_2$, incorporated in the sealing concrete being between 5 and 70 kg per cubic meter of concrete so as to give rise to the formation of a leakproof local barrier when the sealing wall is locally subjected to the percolation of acidic water originating from the surrounding soil.

The process of the invention is suitable for the production of barrier seals withstanding all kinds of acids, except those which attack silica under the conditions prevailing in the vicinity of the barrier. Examples of common acids for which the barrier seal is effective are hydrochloric acid, sulfuric acid, nitric acid, phosphoric acid, acetic acid, and the like. On the other hand, the process of the invention is not suitable for hydrofluoric acid, which attacks silica.

The invention also relates to a sealing concrete which can be used for implementing the process defined above. This concrete comprises water, a clay, and an acid-resistant granulate with self-filtering properties, and is characterized by the presence of an aqueous solution of sodium and/or potassium silicate in a quantity corresponding to 5 to 70 kg of $SiO_2$ per cubic meter of concrete and by the absence of any acidic or acid-generating matter liable to form a solid silicic acid gel with the silicate.

The clay may be any ordinary clay. However, it is preferred to employ bentonite, such as sodium or calcium bentonite.

The acid-resistant granulate must have self-filtering properties. A self-filtering granulate is a granulate in which a considerable proportion of its weight consists of fine particles distributed over the particle size range from 2 to 100 μm, so that in the concrete these fine particles fill the voids existing between the other, large sized, particles of the granulate. An example of a self-filtering granulate is a granulate in which 10 to 30% by weight of the particles are included in the range from 2 to 100 μm. The other particles of the granulate may range in size from 100 μm to several millimeters or even tens of millimeters. It is preferred to employ a siliceous granulate as an acid-resistant granulate.

Sodium and/or potassium silicates are commercially available materials. They are usually marketed in the form of aqueous solutions at a concentration of 20 to 30% by weight. Commercial sodium silicates usually have an Rp ratio ($SiO_2/Na_2O$) of between 2 and 4, but any other ratio could be suitable for the purposes of the invention. It is preferred, however, to employ a sodium silicate which has a relatively high Rp ratio, higher than 3. Commercial potassium silicates, for their part, usually have an Rp ratio ($SiO_2/K_2O$) of between 1.4 and 2.5, but any other ratio could be suitable.

Sodium silicate is particularly suitable in the case where the acid which is to come into contact with the barrier seal is nitric acid or hydrochloric acid. Potassium silicate is particularly suitable in the case where the acid which is to come into contact with the barrier seal is sulfuric acid, acetic acid or phosphoric acid.

The silicate which is initially added produces two beneficial effects. Firstly, it fluidizes the bentonite suspension, and this makes it possible to incorporate large quantities of bentonite in the sealing concrete while maintaining an acceptable workability and, secondly, it lowers the initial permeability coefficient of the concrete. Later on, when the concrete is cast in the trench to produce the barrier seal and when, in some places, this barrier is subjected to the percolation of acidic water, the silicate added gives rise, in the places in question, to the formation of an acid-resistant leakproof barrier of a solid gel of polysilicic acid, owing to the fact that the acid neutralizes the sodium or potassium hydroxide.

It should be noted that the reaction of the silicate with the acid present in the percolated water takes place only locally in places where a percolation of acidic water actually takes place. This allows the neighboring regions of the barrier seal, which remain in an ungelled state, to compensate the local shrinkages due to the gelling and to ensure the continuity of the structure. If the gelling of the whole barrier seal was induced at the time of its construction, by incorporating an acid-generating material in the sealing concrete, as is well known in the field of setting compositions based on an alkali metal silicate, a satisfactory barrier seal would not be obtained. An overall gelling would give rise to the formation of fissures as a result of the phenomenon of shrinkage associated with the gelling.

By way of indication, the composition of preferred sealing concretes according to the invention is given below:

| | |
|---|---|
| siliceous granulate (sand and gravel) in which 10 to 30% by weight are made up of fine particles distributed in the range from 2 to 100 μm | 1,200 to 1,800 kg |
| sodium or calcium bentonite, or other clay | 15 to 150 kg |
| sodium and/or potassium silicate (calculated in the form of $SiO_2$) | 5 to 70 kg |
| water to make up to | 1 m³ of concrete. |

The following nonlimiting example, which reports a test carried out in the laboratory, illustrates well the advantageous effect provided by the present invention

EXAMPLE

A sealing concrete which has the following composition (per 1 m³ of concrete):

| | |
|---|---|
| siliceous granulate | 1,720 kg |
| including | siliceous gravel (5–8 mm): 270 kg<br>siliceous sand (<5 mm): 1,060 kg<br>siliceous fines (2–100 μm): 390 kg |
| bentonite | 35 kg |
| Na silicate (Rp = 3.2) in the form of an aqueous solution at a concentration of 28.5% by weight | 40 liters (11.4 kg of $SiO_2$) |
| water | 300 liters | is placed in a permeability test cell and is subjected to a percolation gradient of 330. When the test is performed with fresh water, the permeability coefficient of the concrete is constantly equal to $2.7 \times 10^{-9}$ m/s. When the test is performed with water whose pH is lowered to the value of 0 by adding sulfuric acid, the initial permeability coefficient remains constant at the value of $2.8 \times 10^{-9}$ m/s for 100 minutes, and then suddenly decreases to reach a constant value of below $1 \times 10^{-10}$ m/s.

We claim:

1. A sealing concrete mixture which will solidify when contacted with acidic water, said concrete mixture comprising water, a clay, an acid-resistant granulate having self-filtering properties, an aqueous solution of a silicate selected from the group consisting of sodium silicate and potassium silicate, said silicate being present in an amount corresponding to 5 to 70 kg of $SiO_2$ per cubic meter of concrete, said concrete mixture being devoid of any acidic or acid-generating matter liable to form a solid silicic acid gel with the silicate.

2. A sealing concrete according to claim 1, wherein said clay is bentonite.

3. A sealing concrete according to claim 1, wherein said granulate is siliceous.

4. A sealing concrete according to claim 1, wherein 10 to 30% of the weight of said granulate is made up of fine particles distributed over a particle size range from 2 to 100 μm.

5. A concrete according to claim 1, which has the following composition:

| | |
|---|---|
| siliceous granulate in which 10–30% by weight are made up of fine particles of a size ranging from 2 to 100 μm | 1,200 to 1,800 kg |
| bentonite or other clay | 15 to 150 kg |
| Na and/or K silicate (calculated as $SiO_2$) | 5 to 70 kg |
| water to make up to | 1 m³ of concrete. |

* * * * *